United States Patent [19]

McEachern, Jr. et al.

[11] Patent Number: 5,403,150

[45] Date of Patent: Apr. 4, 1995

[54] BEARING INSULATING SYSTEM FOR AIRCRAFT TURBOCHARGER

[75] Inventors: J. Albert McEachern, Jr., Mobile; J. W. Brogdon, Daphne, both of Ala.

[73] Assignee: Teledyne Industries, Inc., Los Angeles, Calif.

[21] Appl. No.: 782,715

[22] Filed: Oct. 25, 1991

Related U.S. Application Data

[63] Continuation of Ser. No. 701,611, May 14, 1991, abandoned, and Ser. No. 187,087, Apr. 28, 1988, abandoned.

[51] Int. Cl.6 .............................................. F04D 29/58
[52] U.S. Cl. ................................... 415/177; 415/178; 60/39.75; 277/67; 384/478
[58] Field of Search .............. 415/175, 177, 178, 180, 415/110, 200, 214.1; 277/67, 133, 134; 384/478, 468, 275, 296, 320, 476, 912; 60/39, 75; 417/407

[56] References Cited

U.S. PATENT DOCUMENTS

| | | | |
|---|---|---|---|
| 2,239,228 | 4/1941 | Hankison | 415/180 |
| 4,083,180 | 4/1978 | Thompson et al. | 415/177 |
| 4,101,241 | 7/1978 | Kasuya | 415/178 |
| 4,114,899 | 9/1978 | Kulzer et al. | 415/177 |
| 4,122,673 | 10/1978 | Leins | 415/177 |
| 4,247,246 | 1/1981 | Abe et al. | 415/200 |
| 4,364,717 | 12/1982 | Schippers et al. | 415/180 |
| 4,613,288 | 9/1986 | McInerney | 417/407 |
| 4,652,219 | 3/1987 | McEachern, Jr. et al. | 417/407 |
| 4,746,269 | 5/1988 | Raab | 415/177 |

FOREIGN PATENT DOCUMENTS

| | | | |
|---|---|---|---|
| 3537449 | 1/1987 | Germany | 417/407 |
| 2126663 | 3/1984 | United Kingdom | 417/407 |

OTHER PUBLICATIONS

European pat. 185,515 Jun. 1986.

Primary Examiner—John T. Kwon
Attorney, Agent, or Firm—Gifford, Groh, Sprinkle, Patmore and Anderson

[57] ABSTRACT

A turbocharger having a heat insulating system whereby an aluminum bearing housing, its internal components including bearing assemblies and lubricating oil are insulated from the heat of the turbine. The insulating system includes three basic component parts. The first component part is a partially convoluted backplate interconnecting the bearing housing and the turbine housing. The second component part is an insulator situated next to the backplate and the third component part is a heat shield provided between the turbine wheel and the insulator. Between the backplate and the bearing housing is defined a cavity near the turbine shaft. Oil slingers are provided on the shaft within the cavity to create an oil-air mist when the shaft is rotated, thereby enhancing cooling.

16 Claims, 4 Drawing Sheets

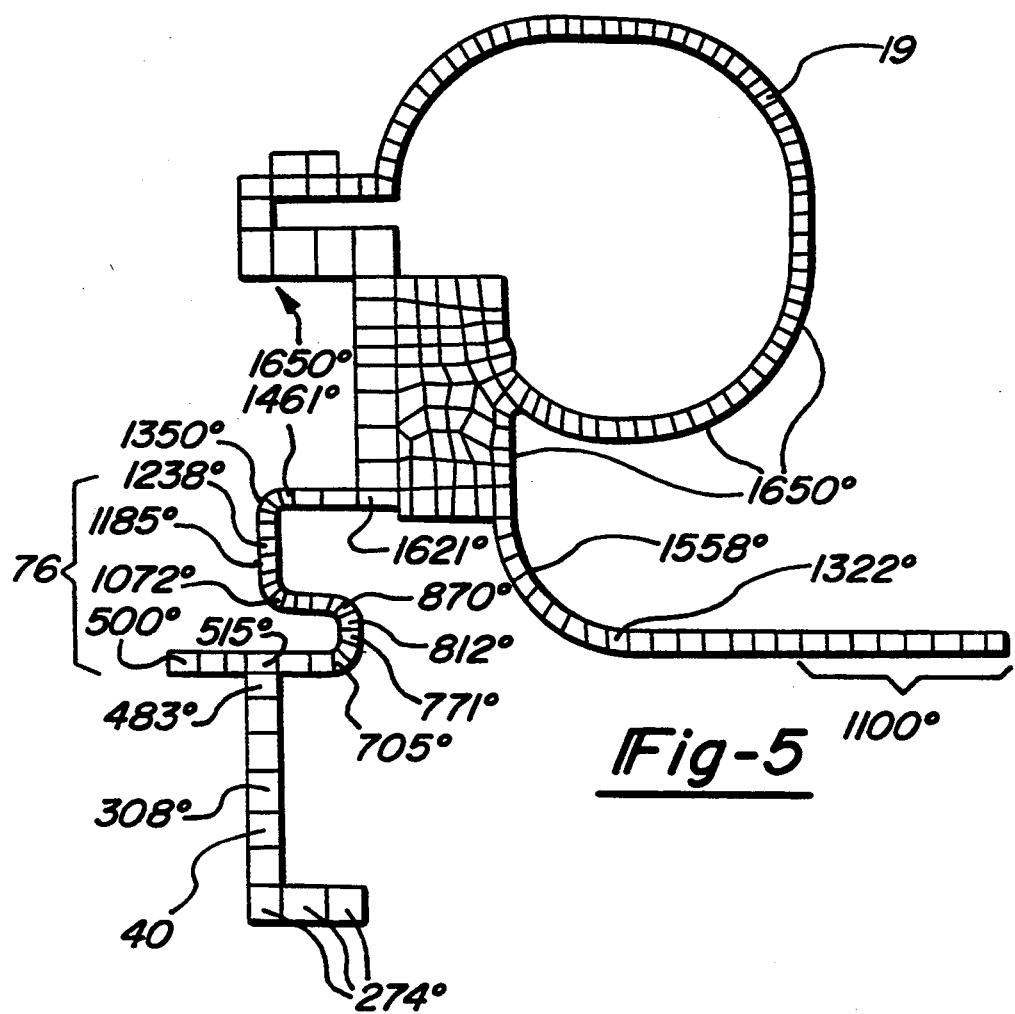

BEARING INSULATING SYSTEM FOR AIRCRAFT TURBOCHARGER

This is a continuation of applications 07/187,087, filed Apr. 28, 1988, and Ser. No. 07/701,611, filed on May 14, 1991, both abandoned.

BACKGROUND OF THE INVENTION

I. Field of the Invention

The present invention relates generally to turbochargers and, more particularly, to a turbocharger with a system for insulating the heat of the turbine of the turbocharger from the bearing housing and the bearing assemblies.

II. Description of the Prior Art

For nearly 30 years, general aviation turbocharged piston engines have been boosted with slightly modified automotive-type turbochargers Although durable and reliable, this type of turbomachinery has seen little change since its introduction and continues to reflect weight and performance characteristics of ground equipment.

A particular impediment toward lighter turbochargers has been the prohibition against utilizing lighter components While a number of components may be fabricated from lightweight materials, certain components have remained limited to composition from heavy metals.

Perhaps the most important component which conventionally defies conversion to a lightweight material is the bearing housing. The bearing system is located inboard of the compressor and turbine housings and includes therein one or more bearing assemblies. Because the high exhaust gas heats to which the turbine wheel and associated elements are exposed sometimes reach over 1650° F., bearing housings are conventially composed of ductile iron. Some are even water cooled. Either way, known constructions translate into a substantial weight penalty.

The potential heat transfer to the bearing housing, the bearing assemblies and the lubricating oil contained therein presents a problem which has long remained unsolved. Because of this high heat, aluminum has not been a practical alternative.

SUMMARY OF THE PRESENT INVENTION

The present invention provides a turbocharger which overcomes all of the above-mentioned disadvantages of the previously known devices.

In brief, the turbocharger of the present invention comprises a bearing housing having a throughbore and bearing assemblies coaxially positioned through the throughbore A shaft extends through the bearing assemblies This shaft has a turbine at one end and a compressor at its other end The turbine includes a turbine wheel fitted to the shaft. The turbine wheel is housed in a turbine housing.

The bearing housing is composed of aluminum, such use being made possible by the inclusion of an insulating system to insulate the bearing housing and its internal parts from the heat of the turbine.

This bearing system includes three main components. The first is a turbine backplate secured to one end of the bearing housing and to the turbine housing The backplate is designed for minimal heat transfer to the bearings The plate is convoluted in order to minimize the heat transfer path.

An insulator is placed next to the backplate and a heat shield is placed between the insulator and the turbine wheel. A cavity is defined between the bearing housing and the turbine backplate. Oil slingers are fitted to the rotating shaft within this cavity to assist in cooling by distributing an oil-air mist.

The primary advantage of the present invention is that the maximum calculated metal temperature in the bearing region is well under 500° F., this temperature being easily endured by an aluminum bearing housing. Furthermore, the entire insulating system is wholly contained within the dimensions of a conventional turbocharger thus resulting in a construction that is not only lightweight, but also compact.

BRIEF DESCRIPTION OF THE DRAWINGS

A better understanding of the present invention will be had upon reference to the following detailed description when read in conjunction with the accompanying drawings wherein like reference characters refer to like parts throughout the several views, and in which:

FIG. 5 is a graphic illustration of turbine housing finite element temperatures as indicated on a turbine housing and backplate shown in partial cross section.

DETAILED DESCRIPTION OF A PREFERRED EMBODIMENT OF THE PRESENT INVENTION

The figures show a preferred embodiment of the present invention. While the configurations according in the illustrated embodiment are preferred, it is envisioned that alternate configurations of the present invention may be adapted without deviating from the invention as portrayed The preferred embodiments are discussed hereafter.

Figure 1:
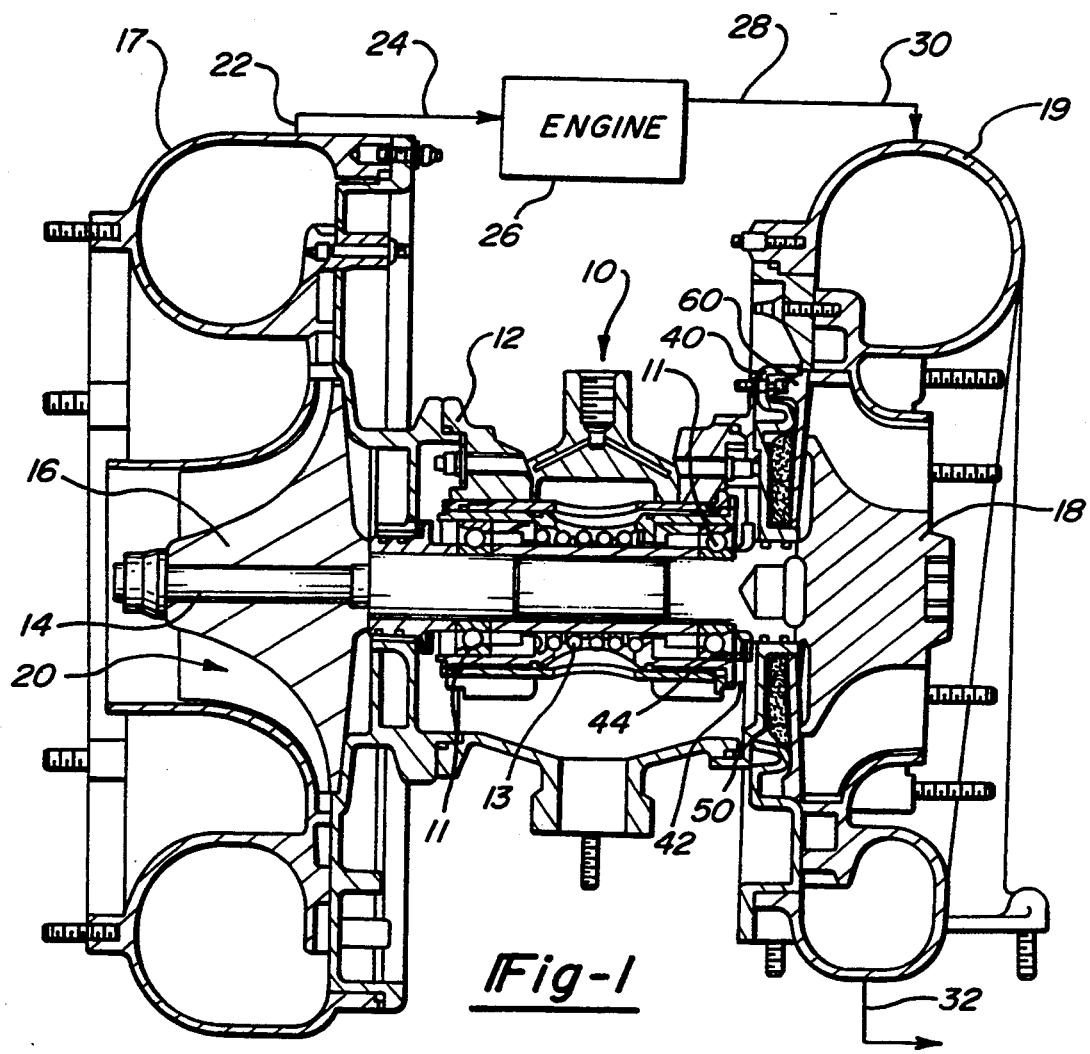
FIG. 1 is a diagrammatic view illustrating the preferred embodiment of the present invention.

Referring to FIG. 1, a preferred embodiment of the turbocharger 10 of the present invention is thereshown and comprises a bearing housing 12 having a shaft 14 rotatably mounted therethrough. The bearing housing 12 includes a pair of outer bearing assemblies 11 and an inner bearing assembly 13 A compressor wheel 16 is secured to one end of the shaft 14 while a turbine wheel 18 is secured to the other end of the shaft 14. The compressor wheel 16 is contained within a compressor housing 17 while, similarly, the turbine wheel 18 is contained within a turbine housing 19.

Upon rotation of the turbine wheel 18, the compressor wheel 16 inducts air from its inlet 20 (illustrated diagrammatically) and supplies the compressed air at its outlet 22 to the intake 24 of an internal combustion engine 26. The internal combustion engine 26 has its exhaust 28 secured to the inlet 30 of the turbine wheel 18 and the exhaust 32 from the turbine wheel 18 is open to the atmosphere. In the conventional fashion, the exhaust from the engine 26 rotatably drives the turbine wheel 18 which in turn rotatably drives the compressor wheel 16 through the shaft 14 to supply compressed air to the engine 26.

With turbine inlet 30 temperatures approaching 1650° F., the heat needs to be dissipated in a very short distance in order to prevent overheating the oil and excessive temperatures in the aluminum bearing structure. Accordingly, the present invention includes a convoluted turbine backplate 40, an insulator 50, and a heat shield 60 The backplate 40, the insulator 50, and the heat shield 60 will be described below with respect to FIG. 2

Between the backplate 40 and the bearing housing 12 is defined a cavity generally indicated by 42. A plurality of oil slingers 44 are provided within the cavity 42. The slingers 44 are fixed to the shaft 14 and create an oil-air mist upon rotation of the shaft 14 This mist assists in cooling.

Figure 2:
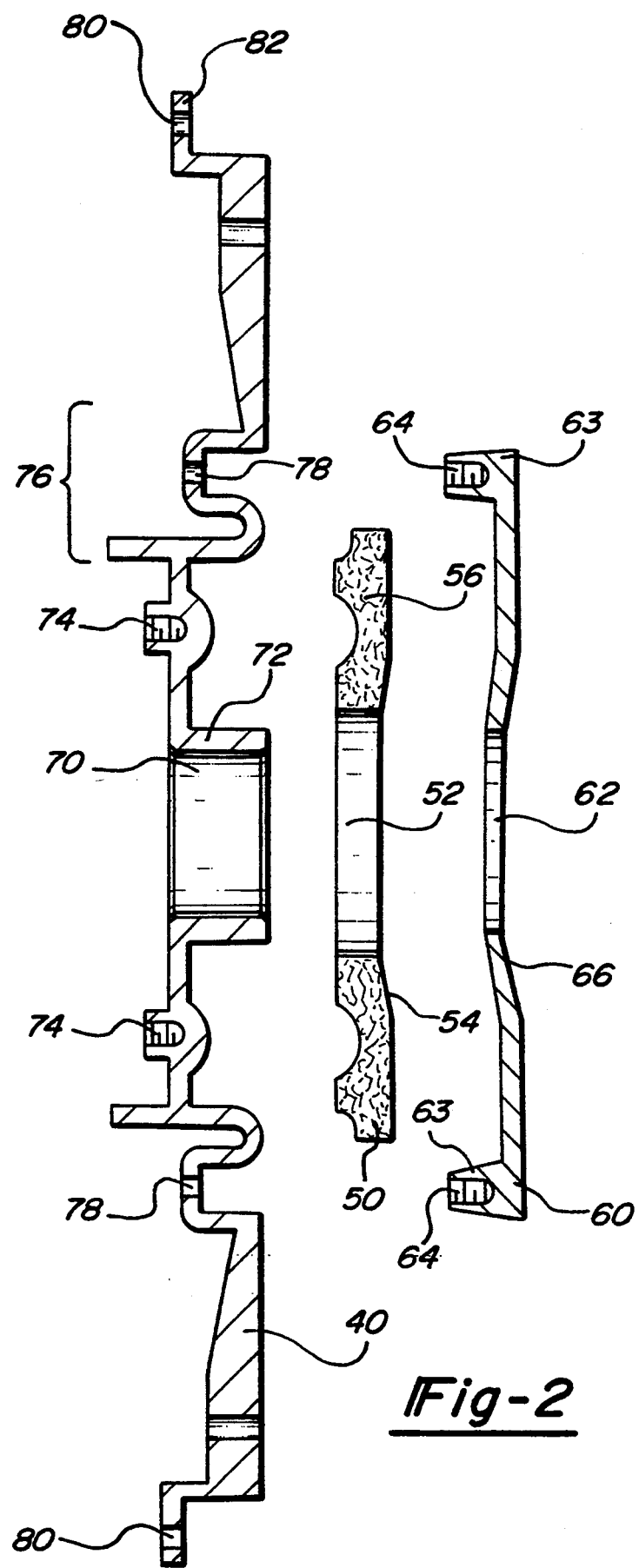
FIG. 2 is a sectional exploded view illustrating the main components of the insulating system according to the present invention.

With reference to FIG. 2, there is shown in cross section the three main components of the insulating system, including the backplate 40, the insulator 50 and the heat shield 60.

The heat shield 60 is situated between the insulator 50 and the turbine wheel 18 (illustrated in FIG. 1). The heat shield 60 is fabricated from Inconel 713LC (trademark) by investment casting. The shield 60 has a bearing sleeve aperture defined therein generally indicated as 62. A number of threaded apertures 64 are defined in a like number of legs 63 provided on the shield 60 for attachment of the heat shield 60 to the backplate 40 by conventional fasteners.

To accommodate the back side of the turbine wheel 18 (illustrated in FIG. 1), the heat shield 60 includes a depressed region generally indicated by 66.

The generally unitary disk insulator 50 has defined therein a bearing sleeve aperture 52. The insulator 50 is preferably composed of a foil skin 54 having an insulating material 56 therein. The foil 54 is preferably 0.002 texturized stainless steel having seams welded around its perimeter The insulating material 56 is preferably Manville Min-K HTS (trademark) which is a high temperature resistant stitched material Because of its relative pliability, the insulator 50 adapts well to the space formed between the heat shield 60 and the backplate 40.

The backplate 40 includes a bearing 70 for rotatably accomodating the shaft 14. The bearing 70 is housed within a bearing sleeve 72 The apertures 52 (of the insulator 50) and 62 (of the heat shield 60) are sufficiently large so as to accommodate the bearing sleeve 72 when the three components 40, 50, 60 are assembled according to the present invention.

The backplate 40 further has defined therein a number of threaded apertures 74 for receiving conventional fasteners to thereby fasten one end of the bearing housing 12 (illustrated in FIG. 1) to the backplate 40.

The turbine backplate 40 is specifically designed for minimal heat transfer to the bearing assemblies 11, 13 (illustrated in FIG. 1) and the bearing housing 12 (illustrated in FIG. 1). Accordingly, its relief discloses a convoluted region, generally indicated by 76, provided in order to minimize the heat transfer path The convoluted region 76 includes a number of apertures 78 through which conventional fasteners are passed for securing the heat shield 60 thereto.

Figure 3:
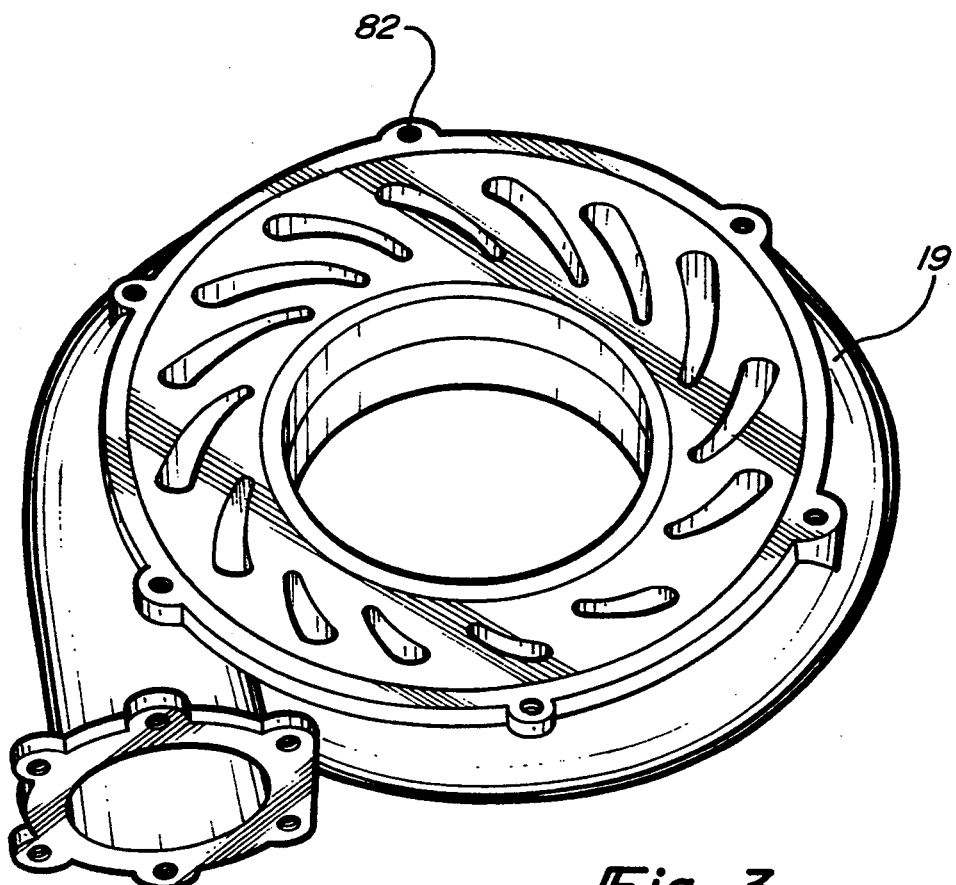
FIG. 3 is a perspective view illustrating a conventional turbine housing.

The turbine backplate 40 further includes a number of fastening apertures 80 defined in its outer lip 82. These apertures 80 permit the bypass of conventional fasteners (not shown) when attaching the backplate 40 to the conventional turbine housing 19 illustrated, by way of example, in FIG. 3. The conventional fasteners are fitted into a number of threaded fastener receiving apertures 82 defined in the turbine housing 19.

The turbine backplate 40 is composed of Inconel 718 (trademark) and is fabricated by investment casting.

Figure 4:
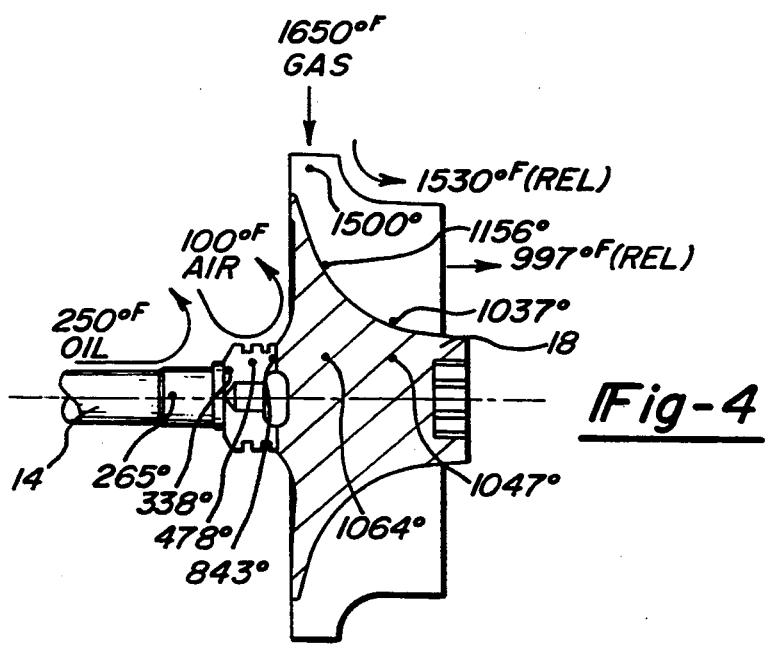
FIG. 4 is a diagrammatic view illustrating calculated turbine wheel and shaft temperature distribution according to the present invention.
Figure 6:
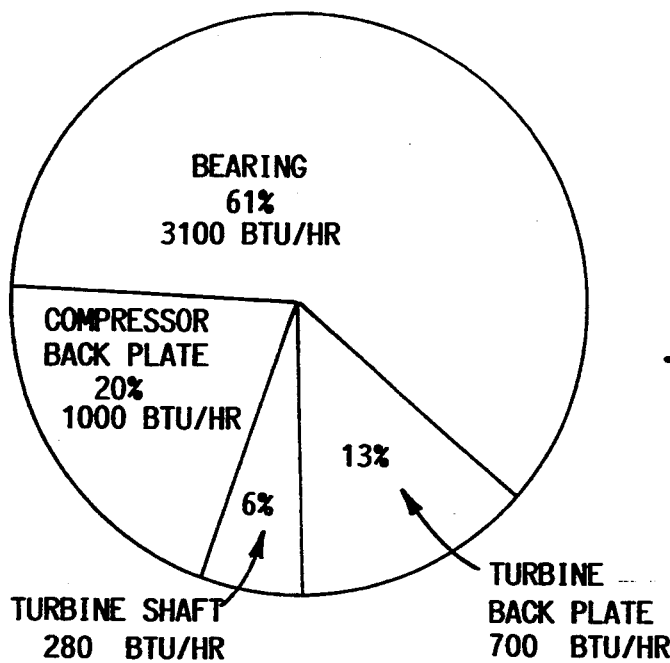
FIG. 6 is a pie graph illustrating calculated HP turbo thermal load fractions according to the present invention.

FIGS. 4–6 graphically illustrate the results of incorporating the insulating system of the present invention into a turbocharging system.

Referring to FIG. 4, the positive effect of heat dissipation in a very short distance coupled with the insulating scheme as described above and the oil-air mist is well illustrated FIG. 4 shows the estimated temperature distribution on the turbine wheel 18 and the shaft 14. The heat transfer analysis assumes 250° F. lube oil inlet temperature and a source of 100° F. buffer air to prevent oil leakage. The maximum calculated metal temperature in the bearing region is well under 500° F.

Referring to FIG. 5, a portion of the turbine end of a turbocharger according to the present invention is illustrated in cross section. Specifically, a section of the turbine housing 19 and the turbine backplate 40 is illustrated. The convoluted region 76 is also illustrated In addition to illustrating these portions of the turbine, FIG. 5 illustrates the results of a finite element analysis done on the region under the same conditions as FIG. 4. At the upper end of the convoluted region 76 the temperature is 1350° F. At the lower end of the region 76 the temperature is 483° F. Accordingly, the maximum calculated metal temperature where the turbine housing 19/backplate 40 and bearing housing 12 mate is 500° F. This temperature is readily managed by the aluminum bearing housing 12. All of the indicated temperatures are within acceptable limits with respect to the aluminum bearing housing, the bearing assemblies and the lubricating oil.

Referring to FIG. 6, the estimated thermal load fractions of the total heat absorbed by the oil is illustrated. It is noteworthy that more heat is transferred to the oil from the compressor end than the turbine end. This is due to the high thermal conductivity of the aluminum compressor housing and compressor backplate A maximum bearing housing temperature of 354° F. was calculated Having described our invention, however, many modifications thereto will become apparent to those skilled in the art to which it pertains without deviation from the spirit of the invention as defined by the scope of the appended claims.

We claim:

1. A turbocharger comprising:

a tubular bearing housing having a throughbore;

a shaft extending through said bearing housing, said shaft having a turbine at one end and a compressor at its other end;

one or more axially contiguous bearing assemblies for rotatably mounting said shaft in said bearing housing; and means for insulating said bearing housing and said bearing assemblies from the heat energy of said turbine, said means for insulating having a turbine backplate, a heat shield, and a pliable generally unitary disk sandwiched between said turbine and said bearing housing, said heat shield is spaced apart from said turbine backplate to define a space between said turbine backplate and said heat shield, and said disk having a metal foil enclosing a pliable insulating material adapted for substantially filling said space between said turbine backplate and said heat shield, said disk having a centrally disposed aperture to receive said shaft whereby said bearing assemblies are protected from heat.

2. A turbocharger according to claim 1 further comprising:
a cavity defined between a selected portion of said bearing housing and said turbine backplate; and
one or more oil slingers rotatably mounted on said shaft within said cavity.

3. A turbocharger according to claim 1, wherein said heat shield is contained between said insulating material and said turbine wheel, said shield being axially spaced from said turbine wheel.

4. A turbocharger according to claim 3 wherein said turbine backplate has a convoluted region.

5. A turbocharger according to claim 4 wherein said bearing housing is composed of aluminum.

6. A turbocharger according to claim 4 wherein said skin of said insulating material is composed of an outer foil wrap having insulation provided therein.

7. A turbocharger according to claim 6 wherein said outer foil wrap is seam welded stainless steel.

8. A turbocharger according to claim 7 further including means for securing said backplate to said turbine housing.

9. A turbocharger according to claim 4 wherein said turbine backplate, said heat shield and said insulating material are coaxially positioned and have said shaft extending therethrough.

10. A turbocharger according to claim 9, wherein said heat shield has a bearing sleeve aperture, said heat shield has a depressed area defined about said bearing sleeve aperture.

11. A turbocharger according to claim 4 wherein said insulating material and said heat shield each have throughbores, said turbine backplate having a bearing sleeve being fittable through said throughbores of said insulating material and said heat shield.

12. A turbocharger according to claim 11 further including means for securing said heat shield to said backplate, thereby securing said insulating material therebetween.

13. A turbocharger according to claim 12 wherein said means for securing includes a plurality of legs provided on said heat shield, each said leg having a threaded aperture defined therein and a conventional fastener being threadable within said threaded aperture.

14. A turbocharger according to claim 13 wherein part of said convoluted region of said backplate includes apertures through which said conventional fasteners are fittable.

15. A turbocharger according to claim 1 further including means for securing said backplate to said bearing housing.

16. A turbocharger comprising:
a tubular bearing housing having a throughbore;
a shaft extending through said bearing housing, said shaft having a turbine wheel at one end and a compressor at its other end;
said turbine wheel being housed in a turbine housing;
one or more bearing assemblies for rotatably mounting said shaft in said bearing housing;
means for insulating said bearing housing and said bearing assemblies from a transfer of heat energy existing in said turbine housing:
said means including:
A) a turbine backplate interconnecting said turbine housing and said bearing housing;
B) a heat shield interfacing said turbine wheel;
C) a space created between said turbine backplate and said heat shield; and
D) pliable insulating material comprising an impervious foilskin being provided between said backplate and said heat shield said pliable insulating material substantially filling said space created between said turbine backplate and said heat shield, said heat shield is contained between said insulating material and said turbine wheel said shield being axially spaced from said turbine wheel, said turbine backplate has an annular convoluted region circumscribing said heat shield, said turbine backplate, said heat shield and said insulating material are co-axially positioned and have said shaft extending therethrough and said turbine backplate includes a bearing sleeve rotatably supporting said shaft at said one end.

* * * * *